US010657854B2

(12) United States Patent
Nocon (10) Patent No.: US 10,657,854 B2
(45) Date of Patent: May 19, 2020

(54) ELECTRICAL CHARGER FOR A SPINNING DEVICE

(71) Applicant: Disney Enterprises, Inc., Burbank, CA (US)

(72) Inventor: Nathan Nocon, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 129 days.

(21) Appl. No.: 15/985,477

(22) Filed: May 21, 2018

(65) Prior Publication Data

US 2019/0251882 A1    Aug. 15, 2019

Related U.S. Application Data

(60) Provisional application No. 62/630,108, filed on Feb. 13, 2018.

(51) Int. Cl.
| | | |
|---|---|---|
| G09F 19/02 | (2006.01) | |
| G09F 13/20 | (2006.01) | |
| G09F 13/02 | (2006.01) | |
| H02J 50/12 | (2016.01) | |
| G09F 13/04 | (2006.01) | |
| G09F 27/00 | (2006.01) | |
| H02J 7/02 | (2016.01) | |
| H02J 7/00 | (2006.01) | |
| H02J 50/10 | (2016.01) | |

(52) U.S. Cl.
CPC .............. G09F 19/02 (2013.01); G09F 13/02 (2013.01); G09F 13/04 (2013.01); G09F 13/20 (2013.01); G09F 27/00 (2013.01); G09F 27/005 (2013.01); H02J 7/0045 (2013.01); H02J 7/025 (2013.01); H02J 50/10 (2016.02); H02J 50/12 (2016.02)

(58) Field of Classification Search
CPC ....................................................... G09F 19/02
See application file for complete search history.

(56) References Cited

U.S. PATENT DOCUMENTS

| 4,943,851 A | 7/1990 | Lang |
|---|---|---|
| 5,057,827 A | 10/1991 | Nobile |
| 5,148,310 A | 9/1992 | Batchko |
| 5,239,892 A | 8/1993 | Sakai |

(Continued)

FOREIGN PATENT DOCUMENTS

| JP | S58-154913 U | 10/1983 |
|---|---|---|
| JP | H1-280992 A | 11/1989 |

(Continued)

OTHER PUBLICATIONS

Denny, M. (2002). Watt steam governor stability. European journal of physics, 23(3), 339. (Year: 2002).*

(Continued)

*Primary Examiner* — Daniel J Cavallari
(74) *Attorney, Agent, or Firm* — Farjami & Farjami LLP (57) ABSTRACT

There is provided a system that includes a base providing a wireless power source, a rotor situated over the base and configured to spin, and a device coupled to the rotor and configured to spin with the rotor, the device having a display and a wireless power receiver, where the wireless power source and the wireless power receiver are configured to power the device to show an image on the display while the rotor is spinning.

16 Claims, 7 Drawing Sheets

(56) References Cited

U.S. PATENT DOCUMENTS

| | | |
|---|---|---|
| 5,714,997 A | 2/1998 | Anderson |
| 6,115,006 A * | 9/2000 | Brotz .................... G02B 30/54 345/6 |
| 6,183,088 B1 | 2/2001 | LoRe |
| 6,208,318 B1 | 3/2001 | Anderson |
| 6,481,851 B1 | 11/2002 | McNelley |
| 6,801,185 B2 | 10/2004 | Salley |
| 7,002,604 B1 | 2/2006 | Barrus |
| 7,477,252 B2 | 1/2009 | Chun |
| 7,490,941 B2 | 2/2009 | Mintz |
| 7,587,120 B2 | 9/2009 | Koo |
| 7,708,640 B2 | 5/2010 | Burak |
| 8,233,032 B2 | 7/2012 | Yukich |
| 8,698,966 B2 | 4/2014 | Liu |
| 9,053,660 B2 | 6/2015 | Liu |
| 9,186,595 B1 | 11/2015 | Cannon |
| 10,310,284 B1 | 6/2019 | Waldron |
| 2003/0142067 A1 | 7/2003 | Kurtenbach |
| 2004/0082283 A1 | 4/2004 | Lindell |
| 2004/0196362 A1 | 10/2004 | Hoshino |
| 2005/0035962 A1 | 2/2005 | Ishibashi |
| 2005/0083570 A1 | 4/2005 | Ueda |
| 2007/0293299 A1 | 12/2007 | Aida |
| 2009/0312979 A1 | 12/2009 | Pan |
| 2010/0007582 A1 | 1/2010 | Zalewski |
| 2011/0199373 A1 | 8/2011 | Liu |
| 2012/0194419 A1 | 8/2012 | Osterhout |
| 2012/0293941 A1 | 11/2012 | Myerchin |
| 2013/0050198 A1 | 2/2013 | Song |
| 2013/0092805 A1 | 4/2013 | Funk |
| 2013/0100126 A1 | 4/2013 | Kim |
| 2013/0100358 A1 | 4/2013 | De Collibus |
| 2013/0343743 A1 | 12/2013 | Yen |
| 2014/0118271 A1 | 5/2014 | Lee |
| 2015/0193084 A1 | 7/2015 | Juni |
| 2015/0212718 A1 | 7/2015 | Kellhammer |
| 2015/0288857 A1 | 10/2015 | Fay |
| 2017/0038829 A1 | 2/2017 | Lanier |
| 2017/0115488 A1 | 4/2017 | Ambrus |
| 2017/0343804 A1 | 11/2017 | Choi |
| 2018/0024373 A1 | 1/2018 | Joseph |
| 2018/0224678 A1 | 8/2018 | Jung |
| 2019/0156710 A1 | 5/2019 | Hanson |

FOREIGN PATENT DOCUMENTS

| | | |
|---|---|---|
| JP | H9-238369 A | 9/1997 |
| JP | 2004-54150 A | 2/2004 |
| JP | 2005-221946 A | 8/2005 |
| JP | 2005-275398 A | 9/2005 |
| JP | 2010-273013 A | 12/2010 |

OTHER PUBLICATIONS

Yasuhiro Suzuk, et al. "Research of Real World Life-Sized Video Avatar Presentation System," *Proceedings of the Virtual Reality Society of Japan Annual Conference* 10, Sep. 29, 2005, pp. 111-114.

Hikechi Maeda, et al. "Experimental Development and Evaluation of All-Around Display System for Video Avatar in the Real World," *Proceedings of the Virtual Reality Society of Japan Annual Conference* 8, Sep. 3, 2003.

Horimai, Hideyoshi, et al. "Full-Color 3D Display System with 360 Degree Horizontal Viewing Angle." *Proc. Int. Symposium of 3D and Contents*, 2010. pp. 1-4.

File History of Related U.S. Appl. No. 15/888,896, filed Feb. 5, 2018, and titled "Floating Image Display System".

File History of Related U.S. Appl. No. 15/985,502, filed May 21, 2018, and titled "Display of a Floating Image With Depth Enhancement".

File History of Related U.S. Appl. No. 15/983,006, filed May 17, 2018, and titled "Multi-Perspective Display of an Image".

File History of Related U.S. Appl. No. 16/011,505, filed Jun. 18, 2018, and titled "Image Display System With Visual Filter".

File History of Related U.S. Appl. No. 16/002,947, filed Jun. 7, 2018, and titled "Image Generation System Including a Spinning Display".

* cited by examiner

ELECTRICAL CHARGER FOR A SPINNING DEVICE

RELATED APPLICATIONS

The present application claims the benefit of and priority to a Provisional Patent Application Ser. No. 62/630,108, filed Feb. 13, 2018, and titled "Electrical Charger for a Spinning Device," which is hereby incorporated fully by reference into the present application.

BACKGROUND

Advances in computer technology and software have made possible the creation of richly featured virtual characters capable of simulating interactivity with a human viewer of the virtual character. The illusion of interactivity can be further enhanced when the virtual character is displayed as a three-dimensional (3D) image, apparently independent of the display system generating it. For example, a display screen upon which a two-dimensional (2D) graphic is rendered may be spun to generate a floating image that appears to be three-dimensional 3D.

One obstacle to use of a system including a spinning device such as a display is implementing a solution for recharging a battery powering the spinning device. Conventional solutions for providing electrical coupling for objects that are spinning utilize slip rings or conductive springs or pins. However, those conventional solutions may be subject to excessive wear, as well as add noise to the system, which can be significantly disadvantageous when the system is a display system providing an interactive 3D floating image.

SUMMARY

There are provided electrical chargers for a spinning device and methods for their use, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
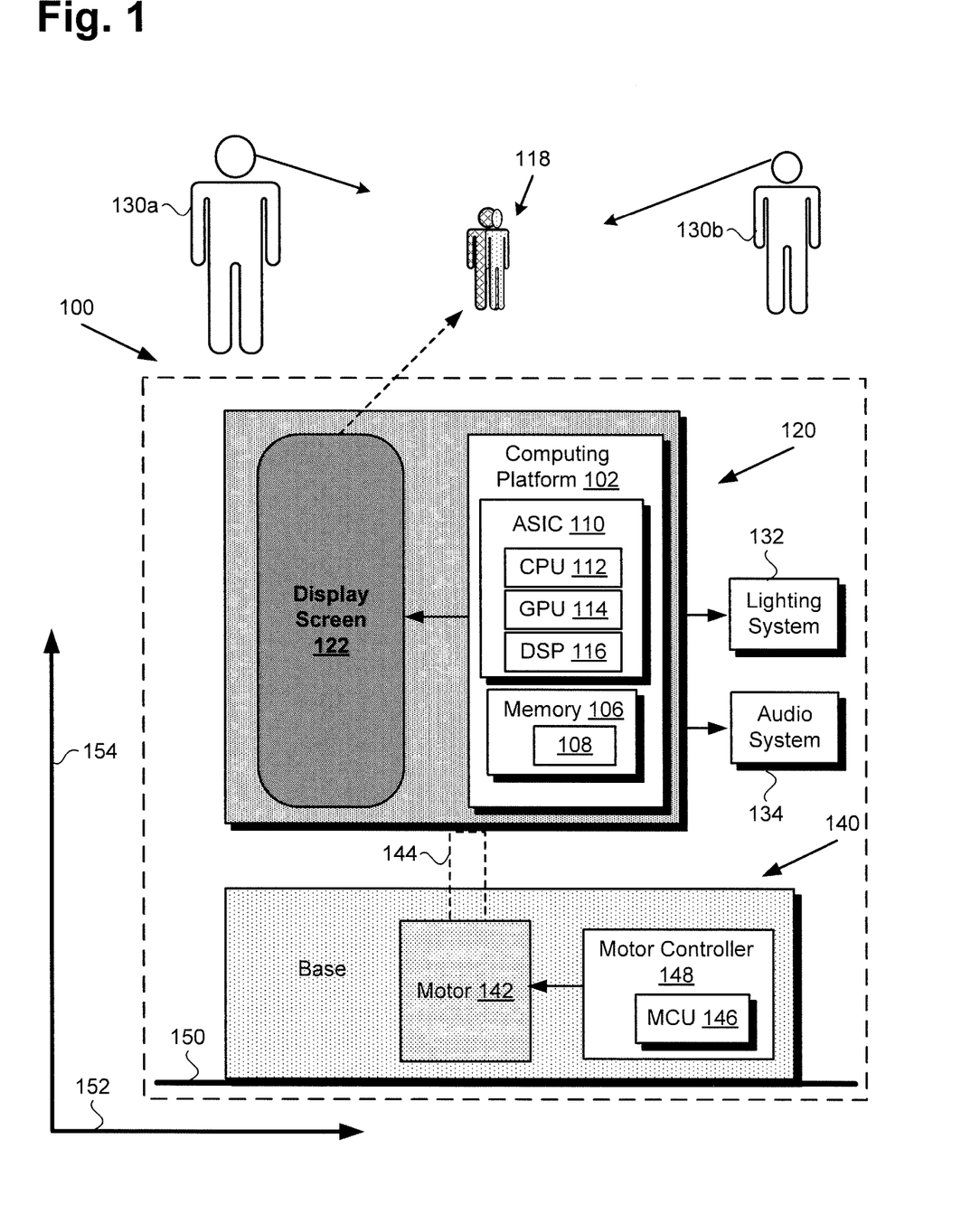
FIG. 1 shows a diagram of an exemplary display system including a spinning device, according to one implementation.

FIG. 1 shows a diagram of exemplary system 100 including a device 120 configured to spin, according to one implementation. As shown in FIG. 1, system 100 is implemented as a display system including device 120 configured to spin, and stationary base 140 coupled to device 120 by rotor 144.

Device 120 includes display screen 122 and computing platform 102 communicatively coupled to display screen 192, as well as to lighting system 132, and audio system 134. As further shown in FIG. 1, computing platform 102 includes application specific integrated circuit (ASIC) 110 including central processing unit (CPU) 112 implemented as a hardware processor, graphics processing unit (GPU) 114, and may further include digital signal processor (DSP) 116. Computing platform 102 also includes system memory 106 implemented as a non-transitory storage device storing software code 108.

Base 140 includes motor 142 for rotating rotor 144 and device 120, and motor controller circuit 148 including motor control unit (MCU) 146. Base 140 is situated on surface 150, which may be a floor or any other substantially horizontal surface. In addition, FIG. 1 shows horizontal axis 152 substantially parallel to surface 150, and vertical axis 154 substantially perpendicular to surface 150. Also shown in FIG. 1 are users 130a and 130b of system 100 viewing floating image 118 generated by system 100.

It is noted that although FIG. 1 depicts lighting system 132 and audio system 134 as communicatively coupled to, but not structurally integrated with, device 120, that representation is merely exemplary. In other implementations, one or both of lighting system 132 and audio system 134 may be structurally integrated with device 120. Thus, in various implementations, device 120 can include one or more of lighting system 132 and audio system 134, in addition to computing platform 102 and display screen 122.

According to the exemplary implementation shown in FIG. 1, device 120 is depicted to include display screen 122 supported by rotor 144 and base 140. However, it is emphasized that the specific features shown in FIG. 1 are merely exemplary, and more generally, device 120 may take the form of any electrical device implemented so as to spin during operation and to require periodic electrical charging.

Figure 2:
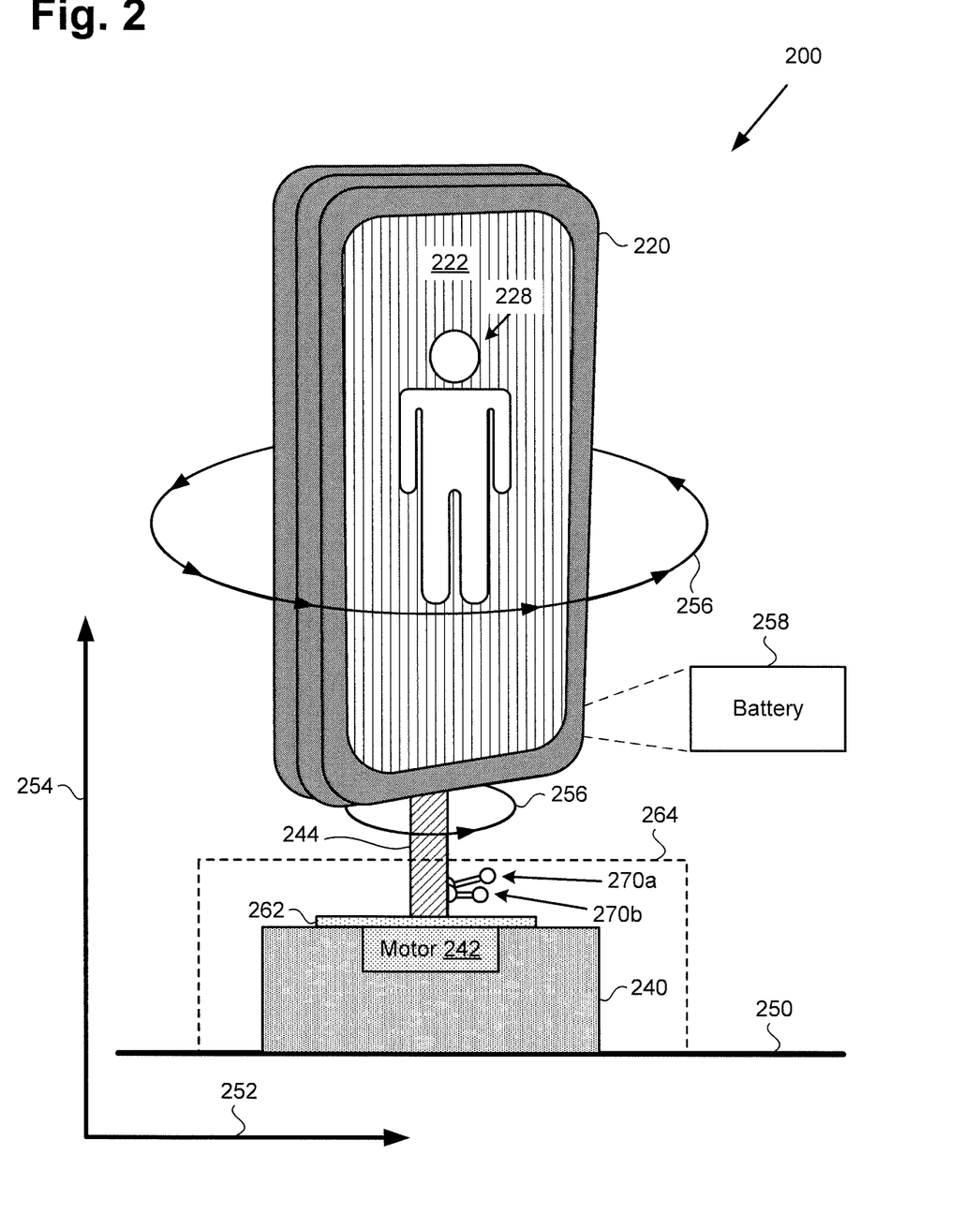
FIG. 2 shows a diagram of an exemplary display system including an electrical charger for a device configured to spin, according to one implementation.

FIG. 2 shows a diagram of exemplary display system 200 including device 220 configured to spin, as well as electrical charger 264 for device 220, according to one implementation. As shown in FIG. 2, device 220 is supported by rotor 244 and base 240 of electrical charger 264, which is shown to include motor 242. Base 240 of electrical charger 264 is situated on surface 250, such as a floor surface or another horizontal surface substantially parallel to the floor surface.

According to the exemplary implementation shown in FIG. 2, device 220 includes display screen 222 rendering two-dimensional (2D) graphic 228, and further includes battery 258. In addition, FIG. 2 shows charging surface 262 of base 240 of electrical charger 264, and charging coupler 270a connected to rotor 244 of electrical charger 264 for providing power to battery 258 of device 220. In some implementations, as further shown in FIG. 2, electrical charger 264 may include optional second charging coupler 270b connected to rotor 244 to provide a ground connection for device 220 (hereinafter "ground coupler 270b").

As shown in FIG. 2, in some implementations, base 240 may serve as a power source for charging battery 258 of device 220. For example, base 240 of electrical charger 264 may include a voltage converter coupled to a mains voltage. Also shown in FIG. 2 are horizontal axis 252 substantially parallel to surface 250, vertical axis 254 substantially perpendicular to surface 250, and spin direction 256 of rotor 244.

Device 220 corresponds in general to device 120, in FIG. 1. Thus, device 220 may share any of the features or functionality attributed to device 120 by the present disclosure, and vice versa. In other words, although not explicitly shown in FIG. 2, device 220 includes features corresponding respectively to ASIC 110 having CPU 112, GPU 114, and DSP 116, and system memory 106 storing software code 108.

In addition, rotor 244, and base 240 including motor 242, correspond in general to rotor 144, and base 140 including motor 142, in FIG. 1. Thus, rotor 244 and base 240 may share any of the features or functionality attributed to rotor 144 and base 140, and vice versa. That is to say, although not explicitly shown in FIG. 2, base 240 includes features corresponding respectively to motor controller circuit 148 and MCU 146. Moreover, like base 240, base 140 includes a feature corresponding to charging surface 262 situated thereon. Also, like rotor 244, rotor 144 may have one or more charging couplers corresponding to one or both of charging coupler 270a and ground coupler 270b connected thereto.

Figure 3:
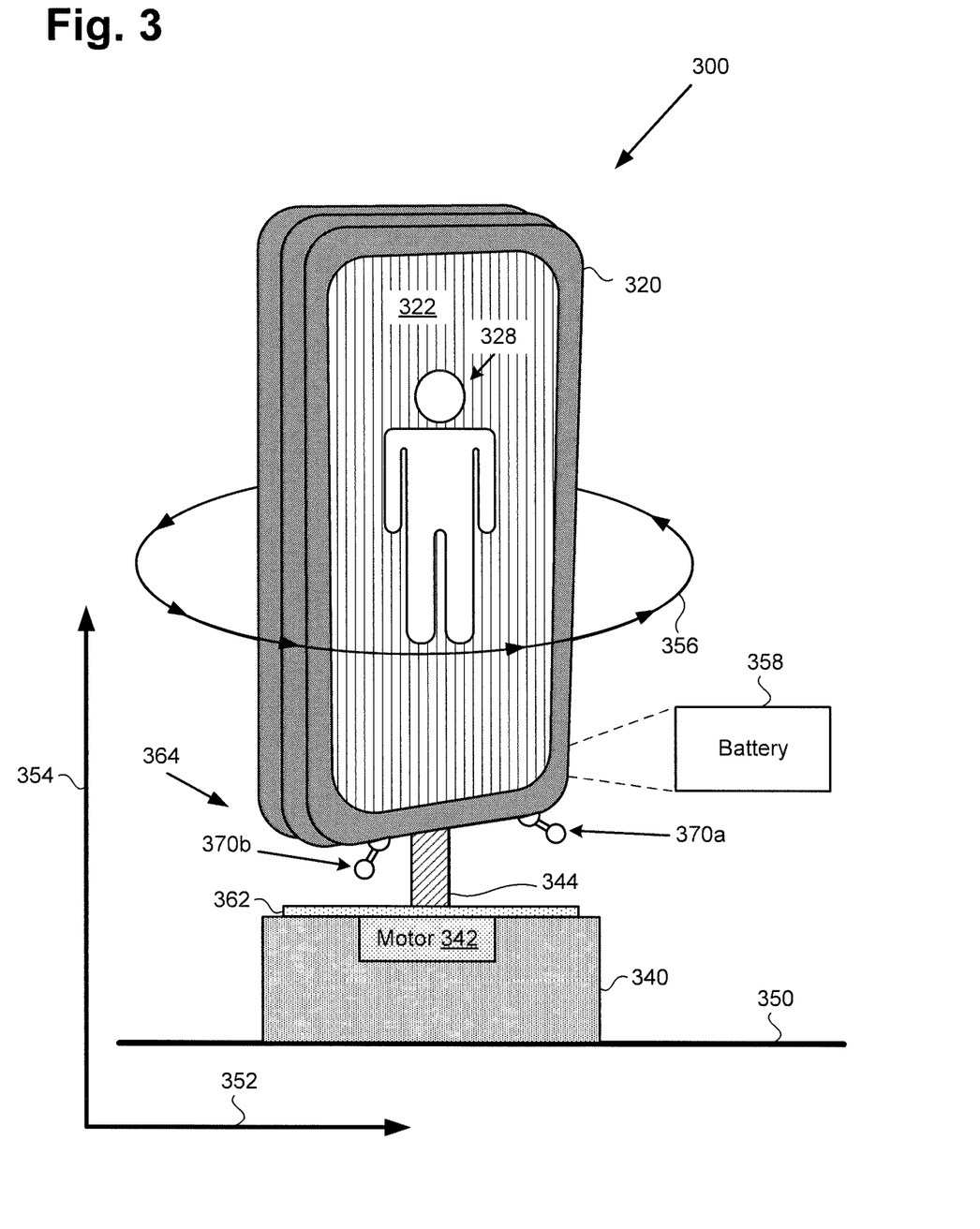
FIG. 3 shows a diagram of an exemplary display system including an electrical charger for a device configured to spin, according to another implementation.

FIG. 3 shows a diagram of exemplary display system 300 including device 320 configured to spin and integrated with electrical charger 364 for device 320, according to another implementation. As shown in FIG. 3, device 320 is supported by rotor 344 and base 340 of electrical charger 364, which is shown to include motor 342. Base 340 of electrical charger 364 is situated on surface 350, such as a floor surface or another horizontal surface substantially parallel to the floor surface.

According to the exemplary implementation shown in FIG. 3, device 320 includes display screen 322 rendering 2D graphic 328, and further includes battery 358. In addition, FIG. 3 shows charging surface 362 of base 340 of electrical charger 364, and charging coupler 370a connected to device 320 for providing power to battery 358 of device 320. In some implementations, as further shown in FIG. 3, electrical charger 364 may include optional ground coupler 370b also connected to device 320. Also shown in FIG. 3 are horizontal axis 352 substantially parallel to surface 350 and vertical axis 354 substantially perpendicular to surface 350.

Device 320 corresponds in general to device 120/220, in FIGS. 1 and 2. Thus, device 320 may share any of the features or functionality attributed to device 120/220 by the present disclosure, and vice versa. In other words, although not explicitly shown in FIG. 3, device 320 includes features corresponding respectively to ASIC 110 having CPU 112, GPU 114, and DSP 116, and system memory 106 storing software code 108.

In addition, rotor 344, and base 340 including motor 342, correspond in general to rotor 144/244, and base 140/240 including motor 142/242, in FIGS. 1 and 2. Thus, rotor 344 and base 340 may share any of the features or functionality attributed to rotor 144/244 and base 140/240, and vice versa. That is to say, although not explicitly shown in FIG. 3, base 340 includes features corresponding respectively to motor controller circuit 148 and MCU 146. Moreover, charging surface 362 corresponds in general to charging surface 262, in FIG. 2, while rotor 344, like rotor 144/244, has spin direction 356 corresponding to spin direction 256.

Furthermore, charging coupler 370a and ground coupler 370b correspond respectively in general to charging coupler 270a and ground coupler 270b, in FIG. 2, and those corresponding features may share any of the characteristics attributed to either corresponding feature by the present disclosure. It is noted that the implementation shown in FIG. 3 differs from the implementation shown in FIG. 2 primarily in that charging coupler 270a/370a and ground coupler 270b/370b are connected to device 120/220/320 in FIG. 3, while those features are connected to rotor 144/244/344 in the implementation of FIG. 2.

Referring to FIGS. 1, 2, and 3 in combination, according to the exemplary implementations shown in FIGS. 2 and 3, display screen 122/222/322 may be controlled by GPU 114 of ASIC 110, while rotor 144/244/344 coupled to device 120/240/340 is controlled by CPU 112 of ASIC 110. CPU 112 is configured to execute software code 108 to render 2D graphic 228/328 on display screen 122/222/322 of device 120/220/320.

CPU 112 is further configured to execute software code 108 to spin rotor 144/244/344 and device 120/220/320 about vertical axis 154/254/354 parallel to display screen 122/222/322 of device 120/220/320 at a predetermined spin rate, which may be on the order of approximately one or more tens or hundreds of rotations per second, for example. That is to say, the rotor 144/244/344 is configured to spin in a plane substantially parallel to charging surface 262/362.

According to the present exemplary implementations, device 120/220/320 generates apparently floating image 118 of 2D graphic 228/328. As a result of the spinning of device 120/220/320, floating image 118 appears to be a three-dimensional (3D) floating image of 2D graphic 228/328 to users 130a and 130b viewing device 120/220/320 configured to spin.

In some implementations, display screen 122/222/322 may take the form of a liquid-crystal display (LCD) screen, for example. Moreover, in some implementations, device 120/220/320 may be a mobile communication device coupled to rotor 144/244/344 and configured to spin with rotor 144/244/344 at the predetermined spin rate. For example, device 120/220/320 may be a smartphone or a tablet computer.

According to some implementations, and in order to reduce the inertia of device 120/220/320, electricity for powering display screen 222/322 may be provided by a relatively small battery included as part of device 120/220/320, i.e., battery 258/358. Due to the relatively small size of battery 258/358, periodic and even frequent charging of battery 258/358 may be necessary. Moreover, in many use cases, it may be advantageous or desirable to charge battery 258/358 automatically at times when device 120/220/320 and rotor 144/244/344 are at a standstill, i.e., are not spinning, without removing device 120/220/320 from rotor 144/244/344 or base 140/240/340. According to the inventive concepts disclosed in the present application, automatic charging of battery 258/358 during quiescent periods during which device 120/220/320 is not spinning is enabled by charging surface 262/362, charging coupler 270a/370a, and in some implementations, ground coupler 270b/370b.

Figure 4A:
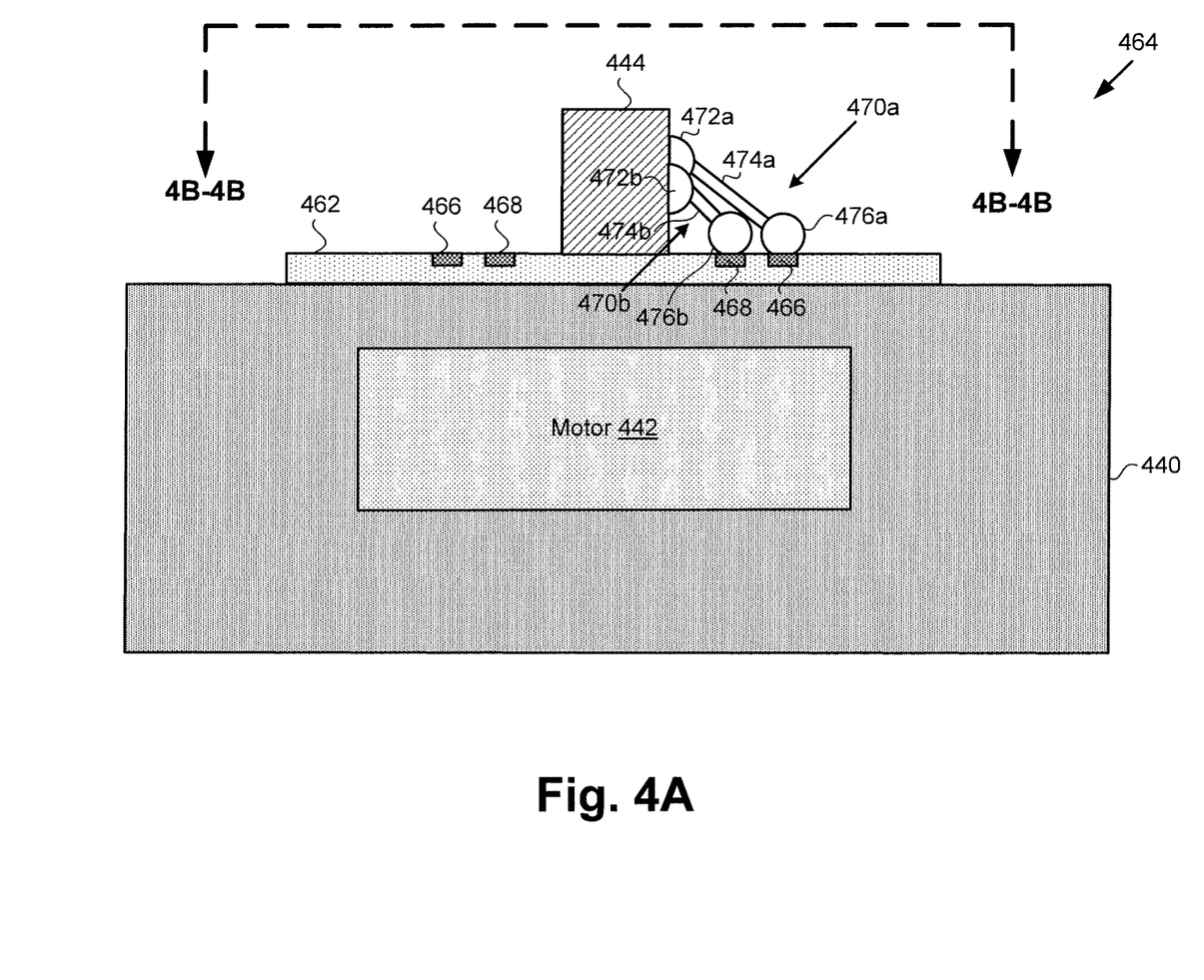
FIG. 4A shows a more detailed cross-sectional view of the exemplary electrical charger shown in FIG. 2 at a time when the rotor of the electrical charger is at a standstill.

Referring to FIG. 4A, FIG. 4A shows a more detailed cross-sectional view of exemplary electrical charger 464, corresponding to the specific implementation of electrical charger 264 in FIG. 2, at a time when rotor 144/244/344 is at a standstill. As shown in FIG. 4A, electrical charger 464 includes base 440 integrated including motor 442 and having charging surface 462 situated thereon. In addition, FIG. 4A shows charging coupler 470a including rotor or device mount 472a, conductive shaft 474a, and contact body 476a, as well as ground coupler 470b including rotor or device mount 472b, conductive shaft 474b, and contact body 476b. Also shown in FIG. 4A are rotor 444, power rail 466 of charging surface 462 providing a positive voltage, ground rail 468 of charging surface 462 providing a ground voltage, and perspective lines 4B-4B corresponding to the perspective of electrical charger 464 shown in FIG. 4B.

Electrical charger 464 corresponds in general to electrical charger 264/364 in FIGS. 2 and 3. That is to say, base 440, motor 442, and rotor 444 correspond respectively in general to base 140/240/340, motor 142/242/342, and rotor 144/244/344, in FIGS. 1, 2, and 3, and those corresponding features may share the characteristics attributed to any corresponding feature by the present disclosure.

In addition, charging surface 462, charging coupler 470a, and optional ground coupler 470b, correspond respectively in general to charging surface 262/362, charging coupler 270a/370a, and optional ground coupler 270b/370b, in FIGS. 2 and 3, and those corresponding features may share the characteristics attributed to any corresponding feature by the present disclosure. Thus, for example, although not explicitly shown in FIGS. 2 and 3, charging surface 262/362 may include features corresponding to power rail 466 and ground rail 468. Moreover, although not shown in FIG. 4A, rotor 444 is coupled to a device configured to spin corresponding to device 120/220/320 in FIGS. 1, 2, and 3.

Figure 4B:
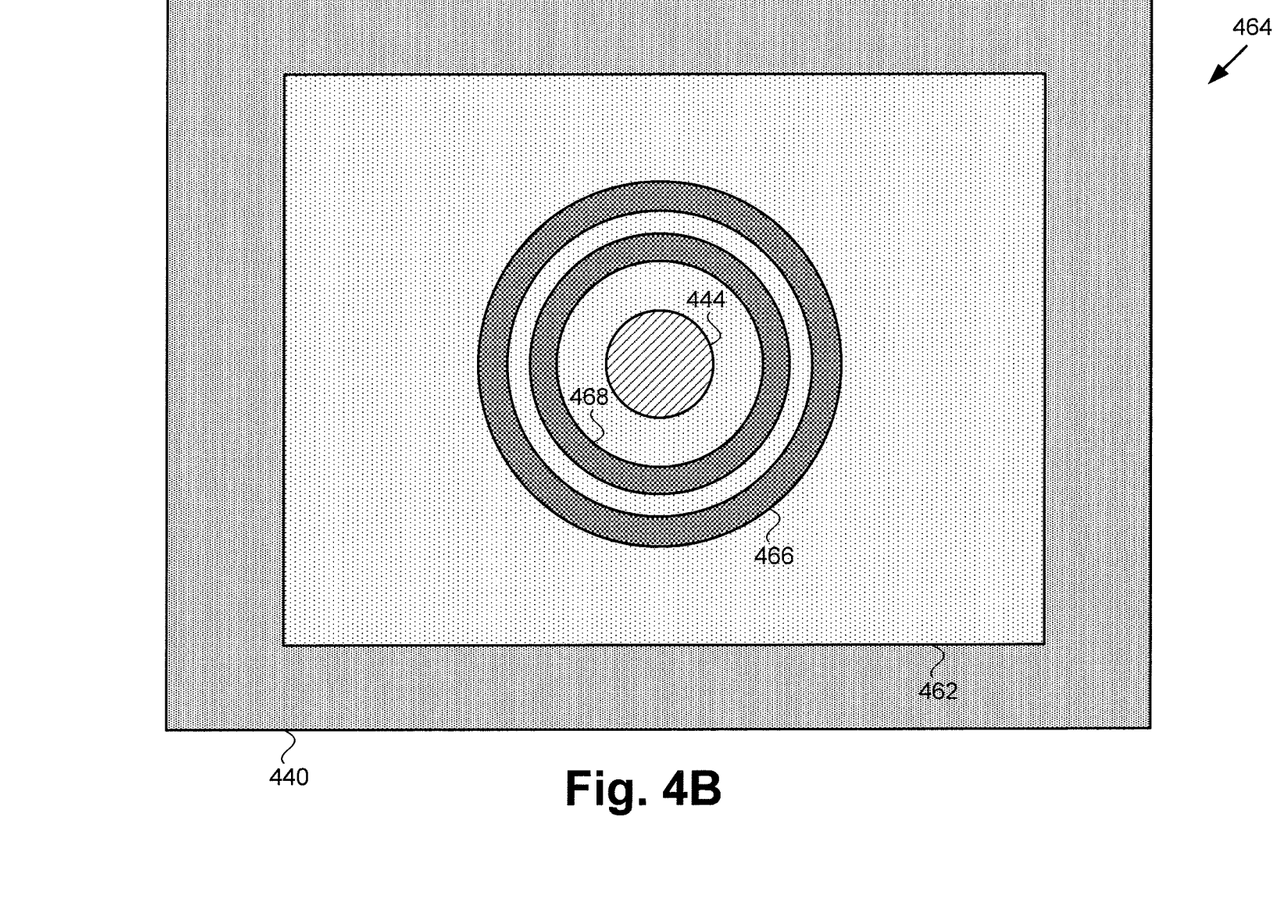
FIG. 4B shows a top view of the exemplary electrical charger shown in FIGS. 2 and 4A along perspective lines 4B-4B in FIG. 4A.

FIG. 4B shows a top view of electrical charger 264/364/464 along perspective lines 4B-4B in FIG. 4A. It is noted that charging coupler 270a/370a/470a and ground coupler 270b/370b/470b are not shown in FIG. 4B in the interests of conceptual clarity. As shown in FIG. 4B, power rail 466 and/or ground rail 468 of charging surface 262/362/462 may be implemented as substantially circular respective power and ground rails. As a specific example, charging surface 262/362/462 may be implemented using a printed circuit board (PCB) having power rail 466 and/or ground rail 468 in the form of substantially circular conductive traces provided by a metallization layer of the PCB.

It is further noted that in some implementations, grounding of device 120/220/320 may achieved independently of charging surface 262/362/462, e.g. grounding may be provided via rotor 144/244/344/444. In those implementations, ground rail 468 may be omitted from charging surface 262/362/462, and ground coupler 270b/370b/470b may be omitted as well. Furthermore, in some implementations, as shown in FIG. 3, charging coupler 270a/370a/470a and/or ground coupler 270b/370b/470b may be connected to or integrated with device 120/220/320, e.g. at right and/or left bottom surfaces or corners of device 120/220/320, rather than being connected to rotor 144/244/344/444.

As shown in FIG. 4B, the substantially circular conductive traces providing power rail 466 and ground rail 468 may be concentric with rotor 144/244/344/444. As shown by the combination of FIGS. 4A and 4B, the circular conductive trace providing power rail 466 may be positioned on charging surface 262/362/462 such that contact body 476a of charging coupler 270a/370a/470a makes electrical contact with power rail 466 when rotor 144/244/344/444 and device 120/220/320 are at a standstill, i.e., not spinning. As further shown by the combination of FIGS. 4A and 4B the circular conductive trace providing ground rail 468 may be positioned on charging surface 262/362/462 such that contact body 476b of ground coupler 270b/370b/470b makes electrical contact with ground rail 468 when rotor 144/244/344/444 and device 120/220/320 are not spinning.

According to the implementations shown in FIGS. 2, 3, and 4A, charging coupler 270a/370a/470a and ground coupler 270b/370b/470b are electrically coupled to battery 258/358 via electrical connections internal to rotor 144/244/344/444 and/or device 120/220/320. Conductive shaft 474a may be formed so as to include a metal, a metal alloy, or any other suitable conductive material for electrically coupling contact body 476a with the electrical connections internal to rotor 144/244/344/444 or device 120/220/320. Conductive shaft 474a may be coupled to rotor or device mount 472a by a hinged coupling or bearing enabling conductive shaft 474a to move freely up and down in the direction of axis 154/254/354 and/or from side to side in the direction of axis 152/252/352, in FIGS. 1, 2, and 3. Contact body 476a is electrically coupled to, and may be rigidly mechanically coupled to conductive shaft 474a. Contact body 476a may be formed of a metal, a metal alloy, or any other suitably electrically conductive material.

Similarly, conductive shaft 474b may be formed so as to include a metal, a metal alloy, or any other suitable conductive material for electrically coupling contact body 476b with the electrical connections internal to rotor 144/244/344/444 or device 120/220/320. Conductive shaft 474b may be coupled to rotor or device mount 472b by a hinged coupling or bearing enabling conductive shaft 474b to move freely up and down in the direction of vertical axis 154/254/354 and/or from side to side in the direction of axis 152/252/352, in FIGS. 1, 2, and 3. Contact body 476b is electrically coupled to, and may be rigidly mechanically coupled to conductive shaft 474b. Contact body 476b may be formed of a metal, a metal alloy, or any other suitably electrically conductive material.

As shown in FIGS. 2 and 3, when rotor 144/244/344/444 and device 120/220/320 are spinning in a plane substantially parallel to charging surface 262/362/462 at or more than a predetermined spin rate, the forces resulting from the centripetal acceleration experienced by charging coupler 270a/370a/470a and ground coupler 270b/370b/470b cause contact bodies 476a and 476b to be lifted up and off of charging surface 262/362/462, thereby breaking their electrical contacts with respective power rail 466 and ground rail 468. That lifting up and off of charging surface 262/362/462 is further enabled by the freedom by conductive shafts 474a and 474b to move in the direction of vertical axis 154/254/354 and/or horizontal axis 152/252/352.

As shown in FIG. 4A, when rotor 144/244/344/444 and device 120/220/320 are spinning at less than the predetermined spin rate, or are not spinning and are at a standstill, gravity causes contact bodies 476a and 476b to be automatically lowered onto charging surface 262/362/462, thereby making electrical contact with respective power rail 466 and ground rail 468. That lowering of contact bodies 476a and 476b onto charging surface 262/362/462 is also further enabled by the freedom by conductive shafts 474a and 474b to move in the direction of vertical axis 154/254/354 and/or horizontal axis 152/252/352. In other words charging coupler 270a/370a/470a and ground coupler 270b/370b/470b are configured to make electrical contact with charging surface 262/362/462 when rotor 144/244/344/444 is not spinning and to break electrical contact with charging surface 262/362/462 after rotor 144/244/344/444 begins to spin.

Figure 5:
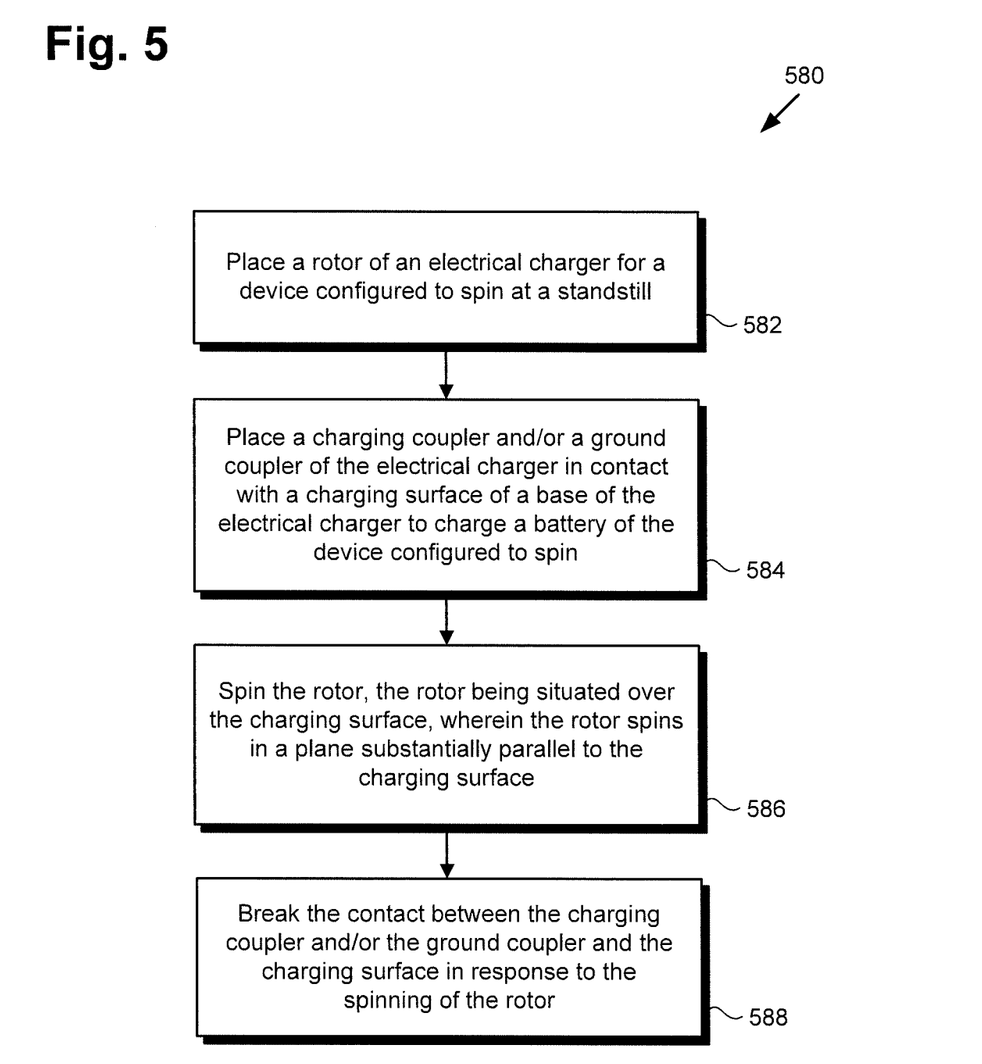
FIG. 5 shows a flowchart of an exemplary method of charging a device configured to spin, according to one implementation.

FIG. 5 shows flowchart 580 of an exemplary method of charging a device configured to spin, according to one implementation. With respect to the method outlined in FIG. 5, it is noted that certain details and features have been left out of flowchart 580 in order not to obscure the discussion of the inventive features in the present application.

Referring to FIG. 5 in combination with FIGS. 1, 2, 3, 4A, and 4B, flowchart 580 begins with placing rotor 144/244/344/444 of electrical charger 264/364/464 at a standstill (action 582). It is noted that the inventive principles disclosed in the present application are applicable to charging a wide variety of devices configured to spin. However, for exemplary purposes, and in the interests of conceptual clarity, the method of flowchart 580 will be described by reference to a specific use case in which device 120/220/320 configured to spin includes display screen 122/222/322 coupled to rotor 144/244/344/444 and configured to spin with rotor 144/244/344/444 in a plane substantially parallel to charging surface 262/362/462.

As noted above, in some implementations, CPU 112 of ASIC 110 may be configured to execute software code 108 to spin rotor 144/244/344/444 and device 120/220/320 about vertical axis 154/254/354 parallel to display screen 222/322 of device 120/220/320 at a predetermined spin rate, which may be on the order of approximately one or more tens or hundreds of rotations per second, for example. Moreover, in those implementations, rotor 144/244/344/444 may be selectively placed at a standstill by software code 108, executed by CPU 112.

Flowchart 580 continues with placing charging coupler 270a/370a/470a and or optional ground coupler 270b/370b/470b in contact with charging surface 262/362/462 of base 140/240/340/440 to charge battery 258/358 when rotor 144/244/344/444 is at the standstill, wherein charging coupler 270a/370a/470a and or optional ground coupler 270b/370b/470b is/are connected to rotor 144/244/344/444, as shown in FIGS. 2 and 4A (action 584). As noted above, charging coupler 270a/370a/470a and or optional ground coupler 270b/370b/470b may make contact with charging surface 262/362/462 automatically, when rotor 144/244/344/444 is at a standstill, due to the force of gravity on contact body 476a and/or 476b.

Flowchart 580 continues with spinning rotor 144/244/344/444, where rotor 144/244/344/444 is situated over charging surface 262/362/462, and where rotor spins 144/244/344/444 in a plane substantially parallel to charging surface 262/362/462 (action 586). As noted above, spinning of rotor 144/244/344/444 may be performed by software code 108, executed by CPU 112 of computing platform ASIC 110, and using motor 142/242/342/442.

Flowchart 580 can conclude with breaking the contact between charging coupler 270a/370a/470a and or optional ground coupler 270b/370b/470b and charging surface 262/362/462 in response to the spinning of rotor 144/244/344/444 (action 588). Charging coupler 270a/370a/470a and or optional ground coupler 270b/370b/470b may break contact with charging surface 262/362/462 automatically when rotor 144/244/344/444 is spinning, due to forces resulting from the centripetal acceleration experienced by charging coupler 270a/370a/470a and/or optional ground coupler 270b/370b/470b causing contact bodies 476a and/or 476b to be lifted up and off of charging surface 262/362/462.

It is noted that, in some implementations, before breaking the contact between charging coupler 270a/370a/470a and or optional ground coupler 270b/370b/470b and charging surface 262/362/462, electrical charger 264/364/464 may advantageously maintain the contact between charging coupler 270a/370a/470a and or optional ground coupler 270b/370b/470b and charging surface 262/362/462 while spinning rotor 144/244/344/44 at less than a predetermined spin rate.

Figure 6:
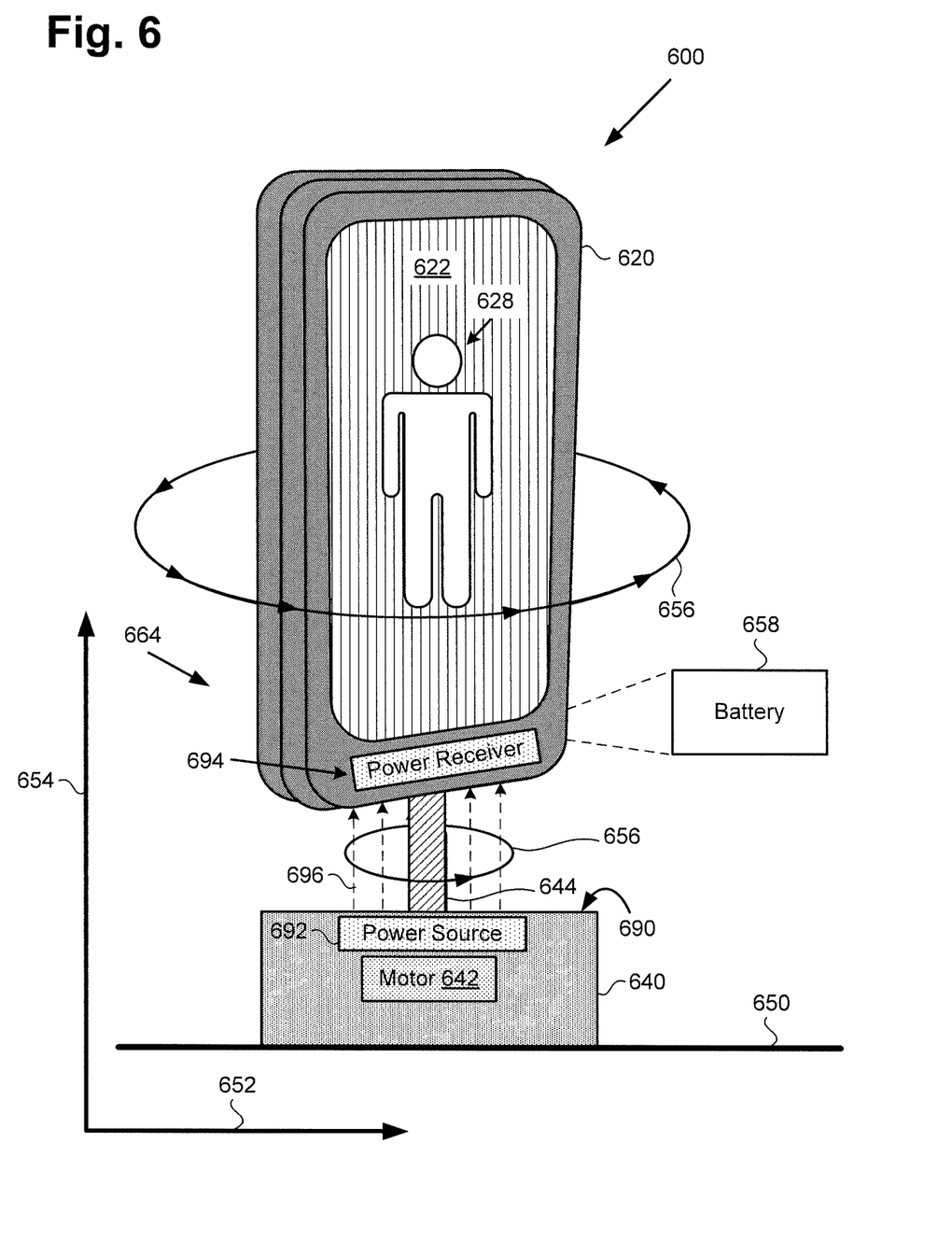
FIG. 6 shows a diagram of an exemplary display system including an electrical charger for powering a device configured to spin, according to yet another implementation.

FIG. 6 shows a diagram of exemplary display system 600 including device 620 configured to spin and integrated with electrical charger 664 for device 620, according to yet another implementation. As shown in FIG. 6, device 620 is supported by rotor 644 and base 640 of electrical charger 664, which is shown to include motor 642. Base 640 of electrical charger 664 is situated on surface 650, such as a floor surface or another horizontal surface substantially parallel to the floor surface, and includes top surface 690.

According to the exemplary implementation shown in FIG. 6, device 620 includes display screen 622 rendering 2D graphic 628, and may further include optional battery 658. In addition, FIG. 6 shows wireless charging or power source 692 provided by base 640 of electrical charger 664, and wireless power receiver 694 connected to device 620. Also shown in FIG. 6 are horizontal axis 652 substantially parallel to surface 650 and top surface 690 of base 640, and vertical axis 654 substantially perpendicular to surface 650 and top surface 690 of base 640.

Device 620 corresponds in general to device 120/220/320, in FIGS. 1, 2, and 3. Thus, device 620 may share any of the features or functionality attributed to device 120/220/320 by the present disclosure, and vice versa. In other words, although not explicitly shown in FIG. 6, device 620 includes features corresponding respectively to ASIC 110 having CPU 112, GPU 114, and DSP 116, and system memory 106 storing software code 108. Furthermore, like device 620, device 120 may be connected to a feature corresponding to wireless power receiver 694.

In addition, rotor 644, and base 640 including motor 642, correspond in general to rotor 144/244/344/444, and base 140/240/3340/440 including motor 142/242/342/442, in FIGS. 1, 2, 3, 4A, and 4B. Thus, rotor 444 and base 440 may share any of the features or functionality attributed to rotor 144/244/344/444 and base 140/240/340/440, and vice versa. That is to say, although not explicitly shown in FIG. 6, base 640 includes features corresponding respectively to motor controller circuit 148 and MCU 146. In addition, like base 640, base 140 may include a feature corresponding to wireless power source 692. Moreover, rotor 644 has spin direction 656 corresponding in general to spin direction 256/356 in FIGS. 2 and 3.

It is noted that the implementation shown in FIG. 6 differs from the implementations shown in FIGS. 2, 3, 4A, and 4B in that wireless power source 692 and wireless power receiver 694 can be configured to power device 620 while rotor 644 is spinning, as shown by field lines 696 transferring power wirelessly from wireless power source 692 to wireless power receiver 694. In some implementations, optional battery 658 may be omitted from device 620, and wireless power source 692 and wireless power receiver 694 may directly power device 620. However, in other implementations, battery 658 may be included, and wireless power source 692 and wireless power receiver 694 may power device 620 by charging battery 658 while rotor 644 is spinning. It is further noted that wireless power receiver 694 is configured to power device 620 and/or to charge optional battery 658 via electrical connections internal to device 620.

Power for powering device 620 and/or charging optional battery 658 while rotor 644 is spinning may be transferred from wireless power source 692 to wireless power receiver 694 using any suitable techniques for wireless power transfer. For example, in one implementation, wireless power transfer while rotor 644 is spinning may occur via resonant magnetic induction, which does not require contact between device 620 including wireless power receiver 694, and base 640 including wireless power source 692. According to that implementation, wireless power source 692 may include a stationary inductive circuit, while wireless power receiver 694 may include an inductive circuit in resonance with the stationary inductive circuit of wireless power source 692, and configured to spin with device 620. As a result, in that implementation, wireless power source 692 and wireless power receiver 694 may power device 620 and/or charge optional battery 658 inductively while rotor 644 is spinning.

Alternatively, in another implementation, wireless power source 692 and wireless power receiver 694 may be configured to utilize radio-frequency (RF) power to power device 620 and/or charge optional battery 658 while rotor 644 is spinning. RF power transfer may occur while rotor 644 is spinning because RF power transfer, like resonant magnetic induction, does not require contact between device 620 including wireless power receiver 694, and base 640 including wireless power source 692. In implementations in which RF power is transferred from base 640 to device 620, wireless power source 692 may include a stationary RF transmitter that beams the RF power using one or more antennas, while wireless power receiver 694 may include one or more antennas utilized to harvest the RF power, and configured to spin with device 620.

In yet another implementation, device 620 includes battery 658, and electrical charger 664 may be configured to wirelessly charge battery 658 while rotor 644 is at a standstill. For example, wireless power transfer while rotor 644 is at a standstill may occur via non-resonant magnetic induction, which requires contact between device 620 including wireless power receiver 694, and base 640 including wireless power source 692. According to that implementation, for example, rotor 644 may be retractable into base 640 when rotor 644 is not spinning so as to place wireless power source 692 in close proximity to wireless power receiver 694. Wireless power source 692 may include a stationary inductive coil, while wireless power receiver 694 may include an inductive coil tightly coupled to the stationary inductive coil of wireless power source 692. As a result, in that implementation, wireless power source 692 and wireless power receiver 694 can charge battery 658 inductively while rotor 644 is at a standstill.

According to the exemplary implementation shown in FIG. 6, display screen 122/222/342/642 may be controlled by GPU 114 of ASIC 110, while rotor 144/244/344/444/644 coupled to device 120/220/320/620 is controlled by CPU 112 of ASIC 110. CPU 112 is configured to execute software code 108 to render 2D graphic 228/328/628 on display screen 122/222/322/622 of device 120/220/320/620.

CPU 112 is further configured to execute software code 108 to spin rotor 144/244/344/444/644 and device 120/220/320/620 about vertical axis 154/254/354/654 parallel to display screen 122/222/322/622 of device 120/220/320/620 and perpendicular to top surface 690 of base 140/240/340/440/640 at a predetermined spin rate, which may be on the order of approximately one or more tens or hundreds of rotations per second, for example. That is to say, the rotor 144/244/344/444/644 is configured to spin in a plane substantially parallel to top surface 690 of base 140/240/340/440/640.

According to the present exemplary implementations, device 120/220/320/620 generates apparently floating image 118 of 2D graphic 228/328/628. As a result of the spinning of device 120/220/320/620, resulting floating image 118 appears to be a 3D floating image of 2D graphic 228/328/628 to users 130a and 130b viewing device 120/220/320/620 configured to spin.

As described above, in one implementation, the present application discloses a solution for electrically charging a device configured to spin. That solution advantageously enables the automatic charging of the device at times when the device is not spinning, i.e., when a rotor coupled to the device is at a standstill. In another implementation, the present application discloses a solution for advantageously powering a device configured to spin while the device spins. Moreover, all charging and/or powering solutions disclosed in the present application advantageously provide for powering/charging of the device without requiring removal of the device from its rotor or base.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
 a base providing a charging surface;
 a rotor situated over the charging surface and configured to spin;
 a device including a battery, the device coupled to the rotor and configured to spin with the rotor; and
 a charging coupler electrically connected to the battery;
 wherein the charging coupler is configured to make electrical contact with the charging surface so as to charge the battery when the rotor is not spinning, and wherein the charging coupler is configured to break electrical contact with the charging surface after the rotor begins to spin.

2. The system of claim 1, wherein the charging coupler is configured to make electrical contact with the charging surface so as to charge the battery while the rotor is spinning at less than a predetermined spin rate.

3. The system of claim 1, wherein the charging surface comprises a substantially circular power rail concentric with the rotor and wherein the charging coupler is configured to make electrical contact with the substantially circular power rail so as to charge the battery when the rotor is not spinning and to break electrical contact with the substantially circular power rail after the rotor begins to spin.

4. The system of claim 3, wherein the charging surface comprises a printed circuit board (PCB), and wherein the substantially circular power rail comprises a conductive trace on the PCB.

5. The system of claim 1, further comprising a ground coupler electrically connected to the battery, wherein the ground coupler is configured to make ground contact with the charging surface when the rotor is not spinning and to break ground contact with the charging surface after the rotor begins to spin.

6. The system of claim 5, wherein the charging coupler is configured to make electrical contact with the charging surface so as to charge the battery and the ground coupler is configured to make ground contact with the charging surface while the rotor is spinning at less than a predetermined spin rate.

7. The system of claim 5, wherein the charging surface comprises a substantially circular power rail and a substantially circular ground rail each concentric with the rotor, and wherein the charging coupler is configured to make electrical contact with the substantially circular power rail and the ground coupler is configured to make ground contact with the substantially circular ground rail when the rotor is not spinning, and wherein the charging coupler is configured to break electrical contact with the substantially circular power rail and the ground coupler is configured to break ground contact with the substantially circular ground rail after the rotor begins to spin.

8. The system of claim 7, wherein the charging surface comprises a PCB, and wherein the substantially circular power rail and the substantially circular ground rail comprise respective conductive traces on the PCB.

9. The system of claim 1, wherein the device comprises a display screen.

10. A method of charging a battery of a device of a system having a base, a rotor, and a charging coupler electrically connected to the battery, the method comprising:
placing the rotor at a standstill;
placing the charging coupler in a contact with a charging surface of the base to charge the battery when the rotor is at the standstill, wherein the charging coupler is connected to the rotor;
spinning the rotor, wherein the rotor is situated over the charging surface; and
breaking the contact between the charging coupler and the charging surface in response to the spinning of the rotor.

11. The method of claim 10, further comprising, before breaking of the contact between the charging coupler and the charging surface, maintaining the contact between the charging coupler and the charging surface while spinning the rotor at less than a predetermined spin rate.

12. The method of claim 10, wherein the charging surface comprises a substantially circular power rail concentric with the rotor and wherein placing the charging coupler in contact with the charging surface comprises placing the charging coupler in contact with the substantially circular power rail.

13. The method of claim 10, wherein the charging surface comprises a printed circuit board (PCB), and wherein the substantially circular power rail comprises a conductive trace on the PCB.

14. The method of claim 10, wherein the device comprises a display screen.

15. The system of claim 1, wherein the charging coupler is connected to the rotor.

16. The system of claim 1, wherein the charging coupler is connected to the device.

* * * * *